(12) United States Patent
Gunderson et al.

(10) Patent No.: US 11,486,340 B1
(45) Date of Patent: Nov. 1, 2022

(54) OUTBOARD MOTOR COWLING WITH AIR INTAKE SYSTEM THAT PROVIDES WATER SEPARATION

(71) Applicant: Brunswick Corporation, Mettawa, IL (US)

(72) Inventors: Andrew C. Gunderson, Fond du Lac, WI (US); Matthew W. Jaeger, Oshkosh, WI (US); Bradley R. Stafford, Omro, WI (US)

(73) Assignee: Brunswick Corporation, Mettawa, IL (US)

( * ) Notice: Subject to any disclaimer, the term of this patent is extended or adjusted under 35 U.S.C. 154(b) by 250 days.

(21) Appl. No.: 17/011,047

(22) Filed: Sep. 3, 2020

(51) Int. Cl.
| | | |
|---|---|---|
| *F02M 35/10* | (2006.01) | |
| *B63H 20/32* | (2006.01) | |
| *B01D 45/08* | (2006.01) | |
| *F02B 61/04* | (2006.01) | |
| *B63H 20/00* | (2006.01) | |

(52) U.S. Cl.
CPC ......... *F02M 35/1015* (2013.01); *B01D 45/08* (2013.01); *B63H 20/001* (2013.01); *B63H 20/32* (2013.01); *F02B 61/045* (2013.01); *F02M 35/10242* (2013.01)

(58) Field of Classification Search
CPC ......... F02M 35/1015; F02M 35/10242; B01D 45/08; B63H 20/001; B63H 20/32; F02B 61/045
See application file for complete search history.

(56) References Cited

U.S. PATENT DOCUMENTS

| | | |
|---|---|---|
| 4,860,703 A | 8/1989 | Boda et al. |
| 6,463,902 B1 | 10/2002 | Curtis et al. |
| 6,932,662 B1 | 8/2005 | Walczak |
| 6,964,255 B2 | 11/2005 | Shomura et al. |
| 7,238,069 B2 | 7/2007 | Ito et al. |
| 7,247,065 B2 | 7/2007 | Ito |
| 7,425,163 B2 | 9/2008 | Murai et al. |
| 7,517,265 B2 | 4/2009 | Takahashi et al. |
| 7,524,223 B2 | 4/2009 | Ochiai et al. |
| 7,806,741 B1 | 10/2010 | Baier et al. |
| 7,867,047 B2 | 1/2011 | Sakamoto |
| 8,651,906 B1 | 2/2014 | Morton |
| 8,690,623 B2 | 4/2014 | Suzuki et al. |
| 8,870,613 B2 | 10/2014 | Watanabe |
| 9,180,950 B1 | 11/2015 | Davenport et al. |
| 9,701,383 B1 | 7/2017 | Stuber et al. |

(Continued)

*Primary Examiner* — Stephen P Avila
(74) *Attorney, Agent, or Firm* — Andrus Intellectual Property Law, LLP

(57) ABSTRACT

A cowling for an outboard motor extends from port side to starboard side in a lateral direction. The cowling includes port and starboard inlets that direct flow of intake air into the cowling and face outwardly in the lateral direction. The cowling further comprises port and starboard duct systems. Each duct system is configured to receive and convey intake air from one of the port and starboard intake ports to an intake conduit for the outboard motor. Each duct system defines a first separation region that receives and conveys the intake air laterally outward to separate a first portion of water from the intake air. Each duct system further defines a second separation region that receives and conveys the intake air from the first separation region laterally inward to separate a second portion of water from the intake air.

20 Claims, 6 Drawing Sheets

(56) References Cited

U.S. PATENT DOCUMENTS

| | | |
|---|---|---|
| 9,963,213 B1 | 5/2018 | Jaszewski et al. |
| 9,969,475 B1 | 5/2018 | Waisanen |
| 10,180,121 B1 | 1/2019 | Waisanen et al. |
| 10,336,429 B1 | 7/2019 | Amerling et al. |
| 10,464,648 B1 | 11/2019 | Amerling et al. |
| 2006/0135008 A1* | 6/2006 | Ito .................. B63H 20/285 440/77 |
| 2006/0258235 A1 | 11/2006 | Kimura et al. |
| 2019/0276122 A1* | 9/2019 | Davis .................. B63B 45/02 |
| 2020/0198748 A1* | 6/2020 | Wiegele .................. F01P 7/16 |

* cited by examiner

OUTBOARD MOTOR COWLING WITH AIR INTAKE SYSTEM THAT PROVIDES WATER SEPARATION

FIELD

The present disclosure relates to marine propulsion devices, and more particularly to cowlings for outboard motors having an air intake system that provides water separation.

BACKGROUND

U.S. Pat. No. 10,336,429 discloses a cowling for an outboard motor that has port and starboard intake ports that direct flow of intake air into the cowling and extend downwardly along the aftward side of the cowling and face laterally outwardly. A duct system receives and conveys intake air intake ports to an intake conduit for the outboard motor. The duct system includes port and starboard intake troughs that extend alongside the intake ports and redirect the intake air from a generally lateral flow into the intake ports to a generally vertically downward flow and then to a generally forward flow towards the intake conduit. Port and starboard baffles that extend alongside the intake ports and direct flow of water into port and starboard channels located alongside the baffles, respectively. The channels drain the water by gravity depending on tilt and trim orientation of the outboard motor.

U.S. Pat. No. 8,651,906 discloses an apparatus for intake of air to an outboard motor that includes an inlet receiving a mixture of air and water from atmosphere surrounding the outboard motor and an outlet discharging the air. A conduit extends between the inlet and the outlet. The conduit has a vertically downwardly oriented first flow path, a vertically upwardly oriented second flow path, and a junction joining the first and second flow paths. The junction is oriented with respect to the first and second flow paths such that both centrifugal and gravitational forces separate the water from the air as the mixture flows therethrough.

U.S. Pat. No. 7,524,223 discloses an outboard motor that is capable of reliably separating water and air sucked in from an intake port and efficiently draining the separated water. The motor can comprise a cowling, a right-side intake port, a left-side intake port, first and second water separating portions, a communication port, and an engine compartment. The right-side intake port can be formed in a right side surface portion of an upper portion of the cowling. The left-side intake port can be formed in a left side surface portion of the upper portion of the cowling. The first water separating portion can have an intake passage communicating between the right-side intake port and the left-side intake port. The second water separating portion can communicate with the first water separating portion through the communication port, and the second water separating portion can communicate with the engine compartment.

U.S. Pat. No. 7,238,069 discloses an outboard motor that has a cowling for enclosing an engine. Air inlet openings are formed in the cowling. An air intake chamber connects the air inlet openings and an air intake duct. Air that flows through the air inlet openings passes through the air intake chamber to the air intake duct. The air is then introduced into the engine. A front wall of the air intake chamber has a center portion positioned rearwardly of outer portions of the front wall. The air intake duct is positioned rearwardly of the front wall of the air intake chamber. The air inlet openings are positioned on both sides of the air intake duct. A rear wall is positioned rearwardly of the air intake duct. Each of the air inlet openings extends from the rear wall to one of the outer ends of the front wall of the air intake chamber.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one implementation of the present disclosure, a cowling for an outboard motor extends from port side to starboard side in a lateral direction. The cowling includes port and starboard inlets that direct flow of intake air into the cowling and face outwardly in the lateral direction. The cowling further comprises port and starboard duct systems. Each duct system is configured to receive and convey intake air from one of the port and starboard intake ports to an intake conduit for the outboard motor. Each duct system defines a first separation region that receives and conveys the intake air laterally outward to separate a first portion of water from the intake air. Each duct system further defines a second separation region that receives and conveys the intake air from the first separation region laterally inward to separate a second portion of water from the intake air.

According to another implementation of the present disclosure, a cowling for an outboard motor extends from top to bottom in a vertical direction, from port side to starboard side in a lateral direction that is perpendicular to the vertical direction, and from forward side to aftward side in an axial direction that is perpendicular to the vertical direction and perpendicular to the lateral direction. The cowling includes port and starboard inlets that direct flow of intake air into the cowling and extend downwardly along the aftward side of the cowling and face outwardly in the lateral direction. The cowling further includes port and starboard duct systems located in the cowling. Each duct system is configured to receive and convey intake air from one of the port and starboard intake ports to an intake conduit for the outboard motor. Each duct system defines a first separation region configured to separate a first portion of water from the intake air. The first separation region includes multiple first ribs extending in the lateral direction. Each duct system further defines a second separation region configured to separate a second portion of water from the intake air. The second separation region includes multiple second ribs extending in the vertical direction.

According to yet another implementation of the present disclosure, a cowling for an outboard motor extends from port side to starboard side in a lateral direction. The cowling includes port and starboard inlets that direct flow of intake air into the cowling and face outwardly in the lateral direction. The cowling further comprises port and starboard duct systems. Each duct system is configured to receive and convey intake air from one of the port and starboard intake ports to an intake conduit for the outboard motor. Each duct system defines a first separation region that receives and conveys the intake air along a first U-shaped path to separate a first portion of water from the intake air. Each duct system further defines a second separation region that receives and conveys the intake air from the first separation region along a second U-shaped path to separate a second portion of water from the intake air.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
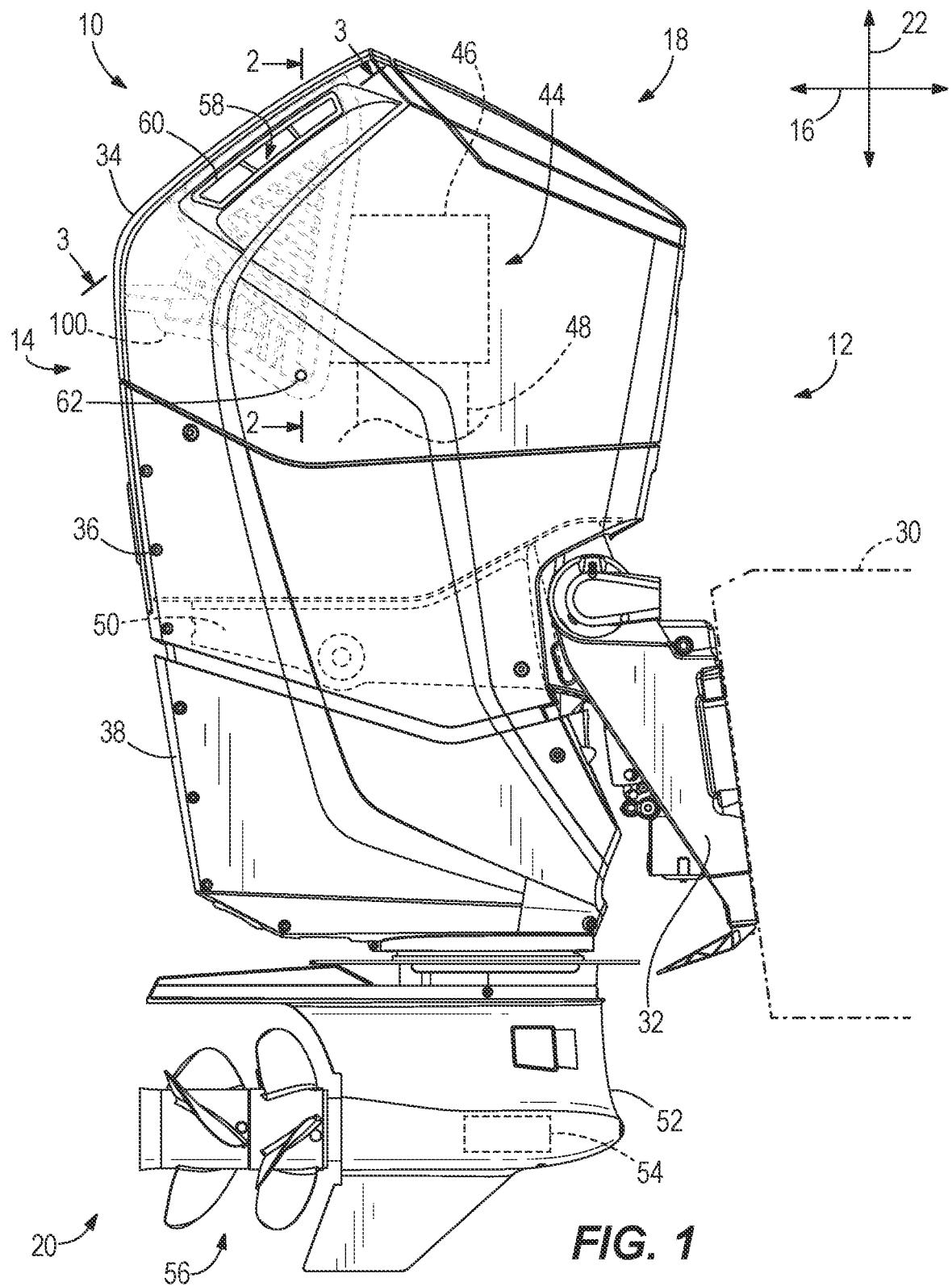
FIG. 1 is a side view of an outboard motor having an air intake system that provides water separation.
Figure 2:
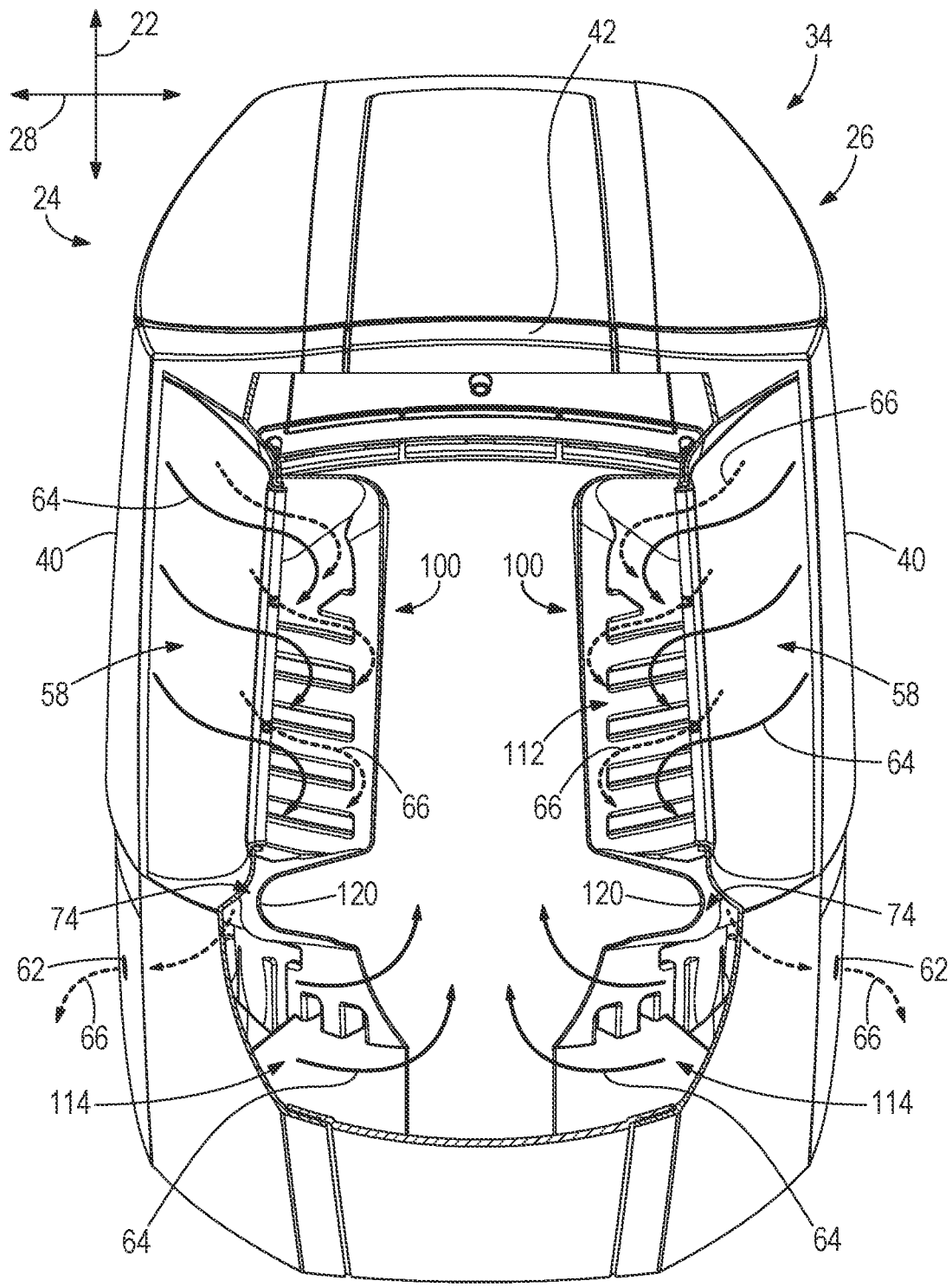
FIG. 2 is a partial cross-sectional view of an upper cowling taken along the line 2-2 of FIG. 1.

FIG. 1 depicts a starboard side view of an outboard motor or propulsion device 10 in accordance with an exemplary preferred embodiment of the present disclosure. In general, the outboard motor 10 extends between a forward side 12 and an aftward side 14 along a fore-aft axis 16, and between an upper side 18 and a lower side 20 along a vertical axis 22. As shown in FIG. 2, orthogonal to the fore-aft axis 16 and the vertical axis 22, the outboard motor 10 extends between a port side 24 and a starboard side 26 in a lateral direction along a port-starboard axis 28. The outboard motor 10 is configured to be coupled to a transom 30 of a marine vessel via a transom bracket 32. A trim actuator may be coupled to the outboard motor 10 and the transom bracket 32 to trim the outboard motor 10 about a trim axis parallel to the port-starboard axis 28.

The outboard motor 10 is shown to include a cowling system with an upper cowling 34, mid cowling 36, and lower cowling 38. Each of the upper cowling 34, mid cowling 36, and lower cowling 38 may include one or more separate components that are coupled to each other. For example, in an exemplary implementation, the upper cowling 34 includes port and starboard halves 40, as well as a central portion 42 (depicted in FIG. 2).

The upper cowling 34 covers a propulsion unit 44 including, for example, an internal combustion engine 46. During operation of the outboard motor 10, intake air for combustion in the internal combustion engine 46 flows generally laterally into port and starboard inlets 58 formed in the upper cowling 34, each of which may be at least partially covered by a bezel 60. Each bezel 60 may protrude partially into the inlet 58. In an exemplary implementation, the present inventors have recognized that protrusion of the bezel 60 into the inlet 58 more than a maximum of 12 mm may adversely affect water separation and pressure drop of the intake air (explained in further detail below).

The port and starboard inlets 58 extend downwardly along the aftward side of the upper cowling 34 and face outwardly in the lateral direction in a shape that evenly distributes air flow across the inlets 58. The size of the inlets 58 may be controlled such that an average velocity of intake air does not exceed a maximum value (e.g., 20 m/s). For example, in an exemplary implementation, a surface area of each of the inlets 58 is approximately (±10%) 92 $cm^2$. The internal combustion engine 46 causes rotation of a generally vertically extending driveshaft 48. In an exemplary implementation, the engine 46 is supported by an isolation mounting cradle 50 that is coupled to the transom bracket 32. The isolation mounting cradle 50 may act to dampen vibrations induced by the engine 46 and other components to reduce the transmission of induced resonance and vibration running through the hull, cabin, and instruments of the marine vessel, resulting in quieter, more comfortable travel. The type and configuration of the cradle 50 can vary from that which is shown. Various types and configurations of suitable supporting cradles are disclosed in U.S. Pat. Nos. 10,464,648; 9,969,475; 9,9632,213; and 9,701,383, each of which is incorporated herein by reference.

Rotation of the driveshaft 48 powers a propulsor 56 that is operably connected to the driveshaft 48 by a transmission gearset 54 that is located in a lower gearcase 52. In the illustrated example, the propulsor 56 includes multiple propellers. The type and configuration of the marine drive shown in the figures is for explanatory purposes only and a can vary from what is shown.

Through research and experimentation, the present inventors have realized that it is necessary to manage the intake air and any ingress of water into the top cowling 42 so that air is efficiently conveyed for combustion in the internal combustion engine 46 within the cowl interior, and so that water is not conveyed to the internal combustion engine 46, but rather is separated from the flow of air and drained from the outboard motor 10. As saltwater and brackish water is heavily mineral-laden, preventing water from being conveyed to the internal combustion engine 46 is important not only to minimize the amount of water consumed by the engine 46 during aspiration, but also to prevent corrosion and mineral spotting within the engine compartment and surfaces.

The present inventors have further determined that water can potentially enter the port and starboard inlets 58 via mist associated with the air, rainwater, or in the form of a wave surge (also known as trailing wake or following sea) onto the outboard motor 10 from the body of water in which the outboard motor 10 is operating. The present inventors have further determined that that it would be desirable to provide an air intake system in the form of duct structures 100 associated with the port and starboard inlets 58 that separate and drain water from all these sources. For example, the present inventors have determined that it would be desirable for duct structures 100 to effectively route rainwater that enters the port and starboard inlets 58 out of the outboard motor 10 through drain holes 62, rather than permitting it to be introduced into the internal combustion engine 46.

The present inventors have further recognized that the orientation or direction in which the port and starboard inlets 58 are facing will vary during operation of the outboard motor 10, which can affect the functionality of the intake system and its water management features. As the outboard motor 10 is trimmed or tilted, the orientation of the port and starboard inlets 58 will vary with respect to rainfall and/or wave surges onto the outboard motor 10. For example, when the outboard motor 10 is in a fully trimmed down position, the port and starboard inlets 58 are less susceptible to the infiltration of rainwater as compared to a position in which the outboard motor 10 is fully tilted up. Also, during normal operation of the outboard motor 10, the outboard motor 10 will be generally trimmed down or tucked into the body of water, at which time the port and starboard inlets 58 will be susceptible to wave surges from the body of water.

The present disclosure is based on the above-described realizations made by the present inventors, and provides a new cowling structure for an outboard motor having novel features for managing intake of air for combustion, while at the same time protecting the outboard motor from ingress of water via, for example, mist, rain, or wave surge. The cowling structure described herein provides maximal water separation from the intake air with minimal pressure drop of the intake air. For example, in an exemplary implementation, the pressure drop through each port and starboard inlet 58 and corresponding duct structure 100 is less than 3.5 inches of water gauge (inAq) for a 600 HP outboard motor 10 with a maximum air flow of 235 g/s though each of the port and starboard inlets 58.

Figure 3:
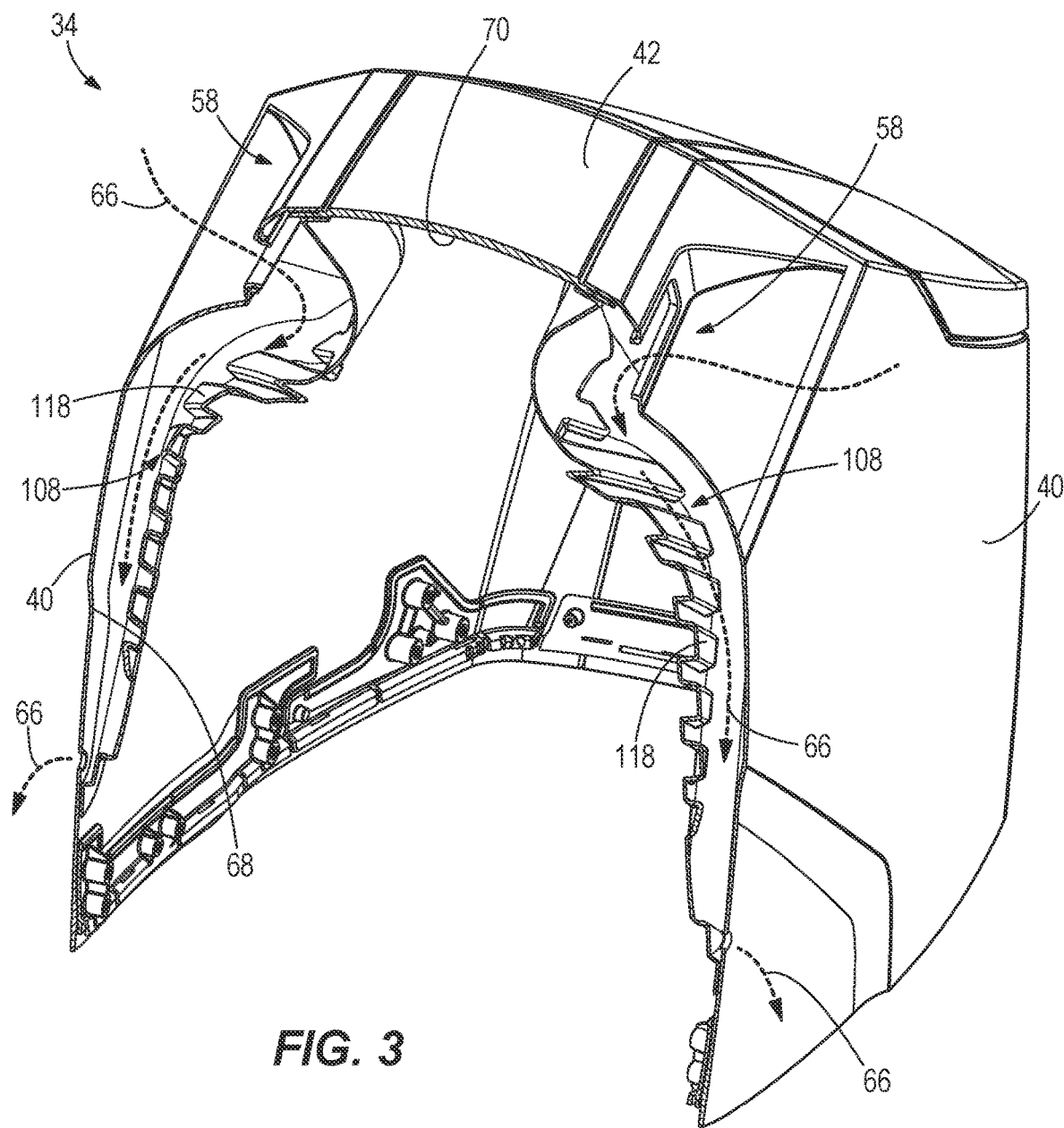
FIG. 3 is another partial cross-sectional view of an upper cowling taken along the line 3-3 of FIG. 1.
Figure 4:
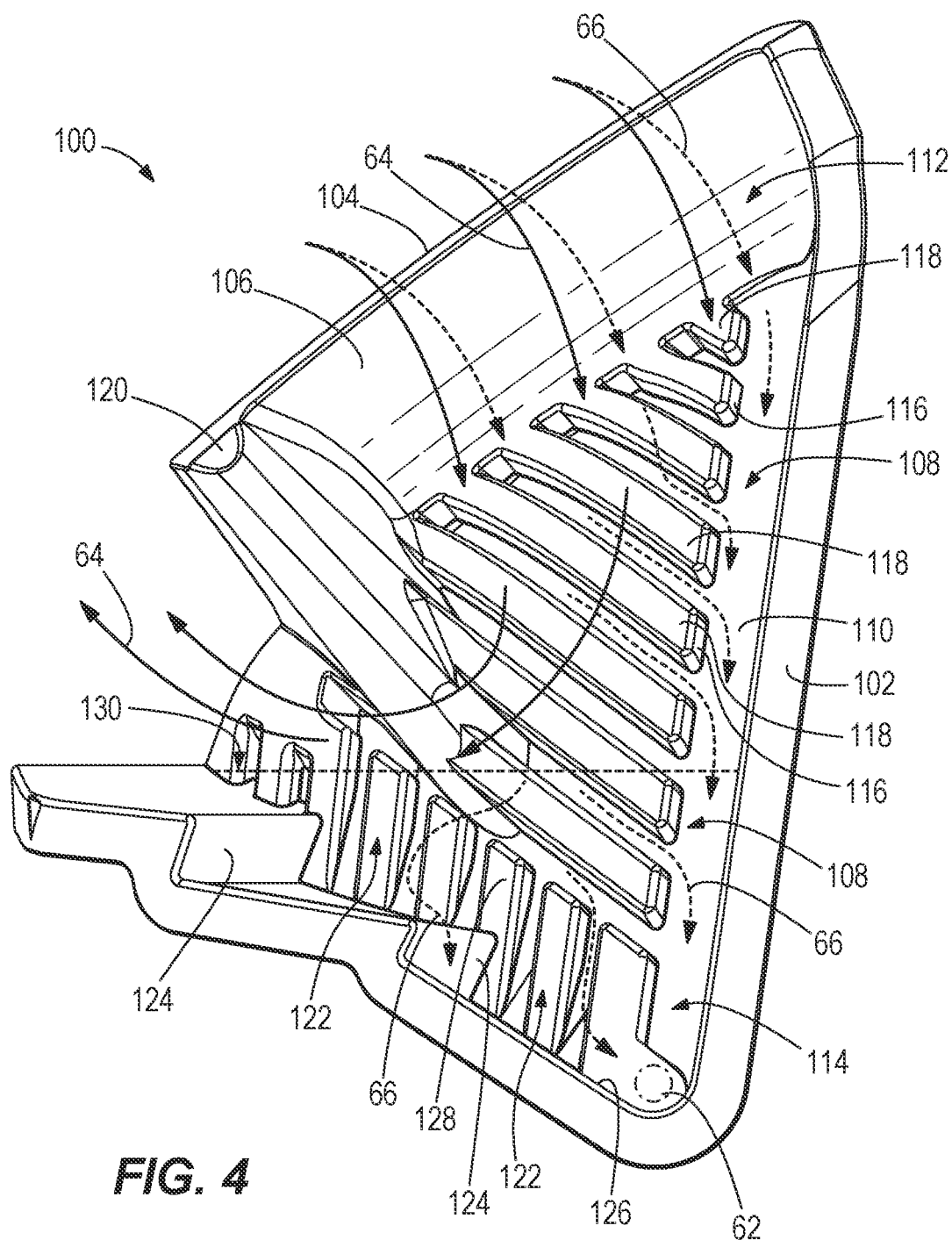
FIG. 4 is a starboard side view of the duct structure that may be positioned within the upper cowling depicted in FIGS. 2 and 3.

Turning now to FIGS. 2-4, views of the top cowling 34 and internal ducting system of the outboard motor 10 are shown. The top cowling 34 is shown to include port and starboard cowling halves 40 that extend laterally outwardly and vertically downwardly from a laterally central cowling portion 42. Port and starboard duct structures 100 are shown to be located in the interior of the top cowling 34. In an exemplary implementation, the cowling halves 40 and the duct structures 100 are fabricated from thermoset polyester composite sheet molding compound (SMC). SMC provides several advantageous characteristics when compared with other cowling materials, including low density and low specific gravity (e.g., 1.25 SG), which minimizes the weight of the cowling halves 40 and the duct structures 100. Use of SMC also results in minimal form deviation issues to achieve a Class A exterior appearance.

The duct structures 100 are configured to receive and convey the lateral flow of intake air indicated by solid arrows 64 from the port and starboard inlets 58 to an intake conduit on the internal combustion engine 46 of the outboard motor 10. (Note: the intake conduit and internal combustion engine 46 are not depicted in FIGS. 2 and 3, but these are conventional items that are normally located in the interior of the top cowling 34, forwardly of the duct structures 100. In an exemplary implementation, the intake air 64 exiting the duct structures 100 circles the engine 46 to cool certain engine components before entering the intake conduit of the internal combustion engine 46) The duct structures 100 are further configured to receive and convey the lateral flow of water indicated by dashed arrows 66 from the port and starboard inlets 58 to port and starboard drain holes 62 formed in the port and starboard cowling halves 40. In an exemplary implementation, the diameter of each drain hole 62 is approximately (i.e., ±10%) 13 mm.

The port and starboard duct structures 100 each include a duct structure body having a laterally outer lip 102 (see FIG. 4) that is fastened to an interior surface 68 of one of the port and starboard cowling halves 40 (see FIG. 3). The duct structure body also has a laterally inner side that includes a curved upper surface 106 that terminates in a laterally inner lip 104. The laterally inner lip 104 is fastened to an interior surface 70 of the laterally central cowling portion 42. The lips 102, 104 may be fastened to the cowling structure using any suitable fastening method, for example, adhesives or mechanical fasteners. In an exemplary implementation, the duct structures 100 can be affixed to the cowling components 40, 42 during an automated adhesive bonding assembly operation.

Upon travelling laterally inward and entering the interior of the top cowling 34 through the port and starboard inlets 58, the upper curved surfaces 106 of the duct structures 100 direct the air and water flow 64, 66 to execute a 180° or generally U-shaped turn and begin traveling laterally outward and vertically downward toward the outer lip 102. Most of the separation between the air flow 64 and the water flow 66 occurs in this region, which is designated as a first separation region 112. Within the first separation region 112, high velocity air and water flow 64, 66 impinges on the upper curved surface 106 and the water flow 66 separates from the air flow 64.

Within the first separation region 112 and between the upper curved surface 106 and the outer lip 102, the duct structure 100 is shown to include multiple lateral ribs 108. As best depicted in FIG. 3, the lateral ribs 108 are oriented within the outboard motor 10 such that each rib is approximately (i.e., ±10°) perpendicular to the upper curved surface 106 of the of the duct structure 100. A first portion of the water flow 66, once separated from the air flow 64, travels along and between the lateral ribs 108 and is conveyed to a drainage valley 110 formed between laterally outward surfaces 116 of the lateral ribs 108 and the outer lip 102. The drainage valley 110 terminates proximate the drainage hole 62 formed in the cowling 40, permitting the water flow 66 to exit the outboard motor 10 and return to the atmosphere.

As the first portion of the water flow 66 travels across the lateral ribs 108 to the drainage valley 110 in the first separation region 112, the air flow 64 sweeps over upper surfaces 118 of the lateral ribs 108 in a curving direction generally angled to the lateral ribs 108. The air flow 64 then curves laterally inward and vertically upward to make another 180° or generally U-shaped turn toward a second separation region 114. As shown in FIGS. 2 and 4, each duct structure body is shown to include a curved divider surface 120 positioned vertically between the first separation region 112 and the second separation region 114. When the port and starboard duct structures 100 are fastened to the top cowling 34, the curved divider surface 120 is positioned close to the port and starboard cowling halves 40 such that a minimal gap 74 is formed. In an exemplary implementation, the gap 74 has a nominal value of 1 mm, although the gap may range from 0 mm to 3 mm depending on component and bonded assembly tolerances. The present inventors have recognized that if the curved divider surface 120 was not included in the duct structure 100, the air flow 64 would short the path over the lateral ribs 108 and not travel laterally outward a sufficient distance to achieve a desirable amount of water separation in the first separation region 112.

Still referring to FIG. 4, the second separation region 114 is shown to include multiple vertical ribs 122 positioned above multiple stepped surfaces 124 formed in a drainage floor 126. As air flow 64 sweeps laterally inward over upper surfaces 128 of the vertical ribs 122 before exiting the duct structure to enter the intake conduit of the internal combustion engine 46, a second portion of the water flow 66 is separated and travels toward the multiple stepped surfaces 124 and the drainage floor 126. In an exemplary implementation, this second portion of water separated from the air flow 64 in the second separation region 114 is significantly smaller in volume than the first portion of water separated from the air flow 64 in the first separation region 112. For example, approximately 90% of the total water volume separated from the air flow 64 is separated in the first separation region 112, while the remaining 10% is separated in the second separation region 114.

Although the second separation region 114 accounts for a smaller portion of water separation than the first separation region 112, the features of the second separation region 114 play a critical role in ensuring that water flow reaching the intake conduit of the internal combustion engine 46 is minimized. Both the stepped surfaces 124 and the drainage floor 126 are shown to slope vertically downward, with the drainage floor 126 terminating laterally proximate the drainage hole 62 formed in the cowling 40. In this way, the water flow 66 separated and conveyed along the vertical ribs 122 and the stepped surfaces 124 in the second separation region 114 is mingled with the water flow 66 separated and conveyed along the lateral ribs 108 and drainage valley 110 in the first separation region 112 before exiting the top cowling 34 through the drainage hole 62.

In an exemplary implementation, the drainage hole 62 must be continually immersed in water during operation of the outboard motor 10 to prevent the drainage hole 62 from acting as an air inlet and preventing drainage of water flow 66 to the atmosphere. To keep the drainage hole 62 immersed in water and avoid sweeping it up the stepped surfaces 124, the velocity of the air flow 64 may be lower in the second separation region 114 than the first separation region 112. In an exemplary implementation, a water volume of approximately 7 to 12 cm$^3$ may be maintained around the drainage hole 62. The total volume of water separation may thus be affected by the trim of the outboard motor 10, as a positive trim condition (i.e., rotation of the outboard motor 10 toward the forward side 12) permits a greater volume of separated water to be maintained around the drainage hole 62 than a negative trim condition (i.e., rotation of the outboard motor 10 toward the aftward side 14). In the absence of the maintained volume of pooled water resisting an inlet air flow, the velocity of air entering the top cowling 34 through the drainage hole 62 can approach 20 m/s at high engine speeds, blocking any separated water from exiting through the drainage hole 62. In an exemplary implementation, a separation gap of at least 7 mm may be maintained between the drainage hole 62 and the closest vertical rib 122 to minimize a risk of debris collecting and occluding the drainage hole 62.

Dashed line 130 (depicted in FIG. 4) is provided to indicate a trap capacity of the duct structure 100 when the outboard motor 10 is in a full engine tuck position (e.g., approximately −6° trim). In an exemplary implementation, the minimum volume of water permitted to be trapped in each of the port and starboard duct structures 100 is approximately 2.6 liters (L). This trap capacity may be increased as the engine is trimmed outward. The present inventors have recognized that the trap capacity of each duct structure 100 must accommodate wash over conditions without permitting any significant amount of water to enter the engine compartment or intake conduit of the internal combustion engine 46. Wash over conditions may occur when the speed of marine vessel is reduced quickly, or when backing down while fishing.

Figure 5:
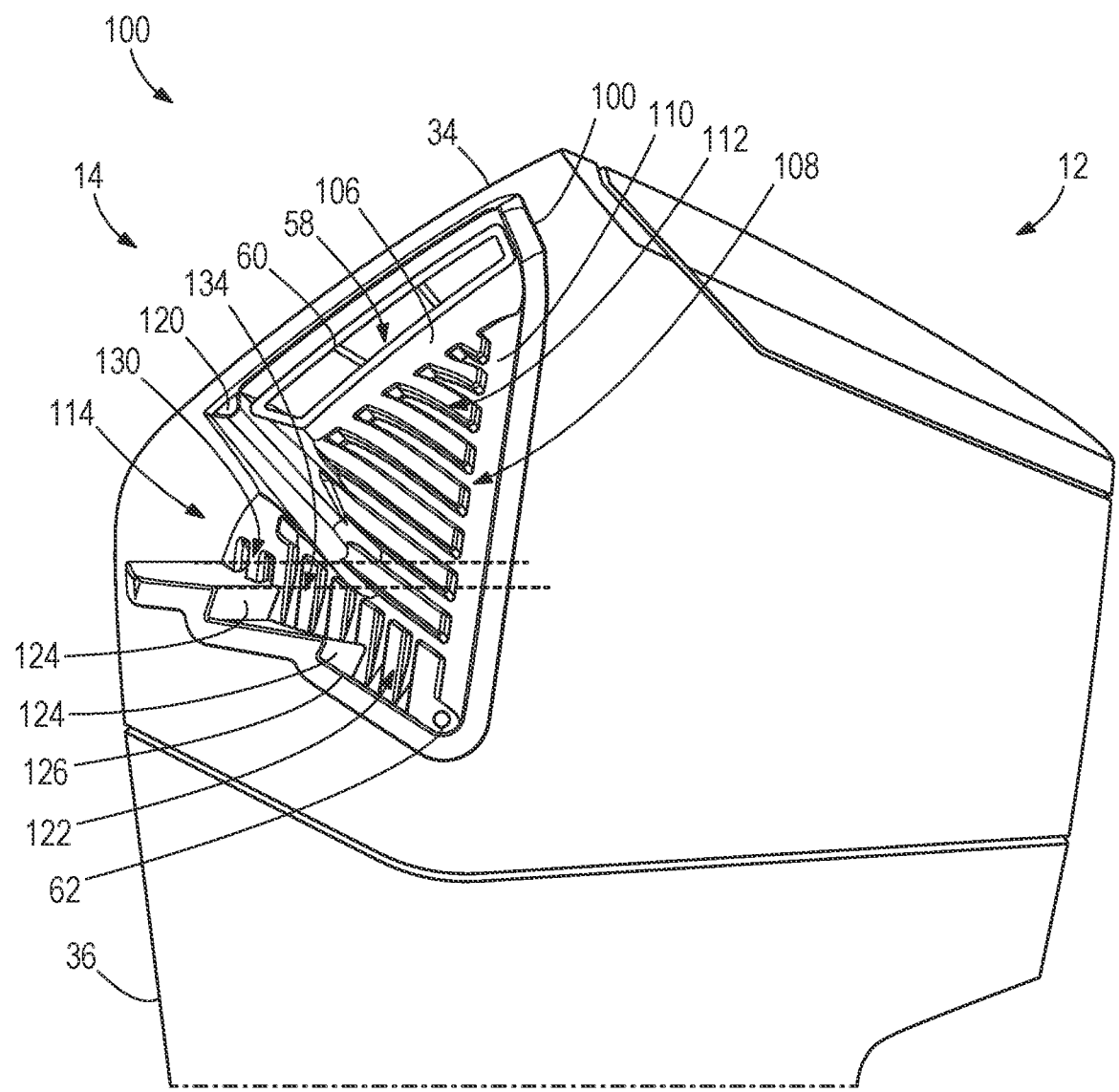
FIG. 5 is a starboard side of the upper cowling of FIGS. 2 and 3 illustrating a trailing wake condition.

Turning now to FIG. 5, a side view of the top cowling portion 34 of the outboard motor 10 is shown. As is depicted in FIG. 4, FIG. 5 depicts the duct structure 100 of the outboard motor 10 in a full tuck engine position. Dashed line 134 represents the trap water level that can be expected to enter the outboard motor 10 due to the single wave wash under worst-case scenario trailing wake conditions. Modeling completed by the inventors has shown that the volume of water represented by the trap water level 134 is approximately 1.5 L. Advantageously, when the outboard motor 10 is in the full engine tuck position, the trap water level indicated by dashed line 134 is only 58% of the trap capacity indicated by dashed line 130.

As described above, in an exemplary implementation, the drainage holes 62 formed in each cowling 40 are approximately 13 mm in diameter. Further modeling completed by the inventors has shown that the trap water volume of 1.5 L per duct structure 100 drains to the atmosphere through each drainage hole 62 in approximately 17 seconds (s), provided the drainage hole 62 is unobstructed. This results in a calculated nominal duct drain rate of 0.09 L/s. Even at a Maximum Material Condition (MMC) in which the drainage holes are 12.5 mm in diameter, the inventors have calculated a duct drain rate of at least 0.08 L/s.

Figure 6:
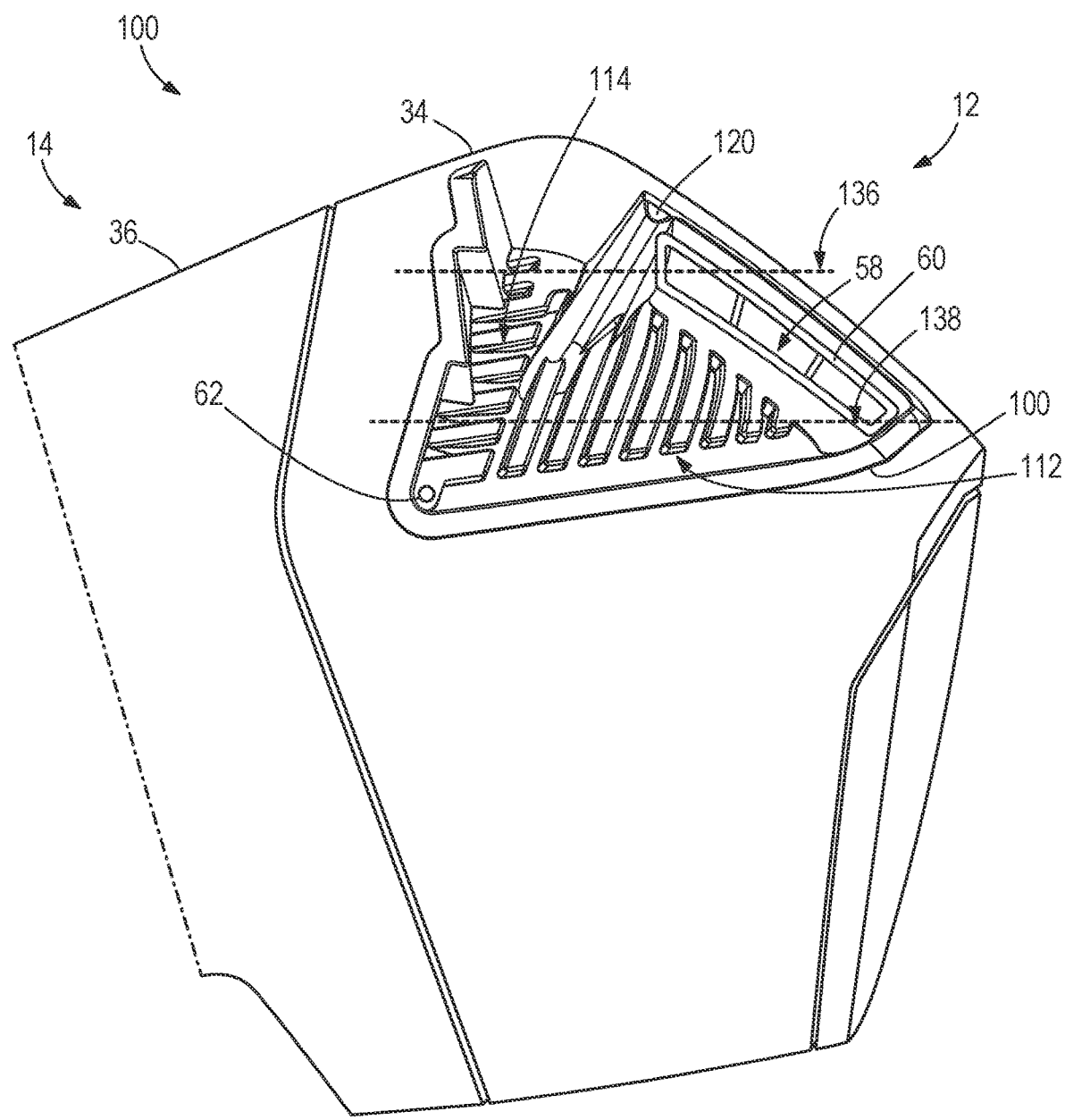
FIG. 6 is another starboard side view of the upper cowling of FIGS. 2 and 3 illustrating a maximum engine tilt condition.

Referring now to FIG. 6, a side view of the upper cowling 34 illustrating a maximum engine tilt condition is depicted. As shown, the maximum engine tilt condition is representative of an approximately 81° clockwise rotation of the position of the outboard motor 10 from the full engine tuck position depicted in FIG. 5. The present inventors have recognized that the internal combustion engine 46 may be particularly susceptible to the incursion of rainwater when the outboard motor 10 is in the maximum engine tilt condition, and the port and starboard inlets 58 are at least partially facing the sky. The present inventors have further recognized that the maximum torrential downpour rainfall rate on record is 0.03 L/sec. (Note: this rainfall rate was only sustained for 1 minute total.) Provided the drainage holes 62 are unobstructed, the calculated duct drain rate of 0.09 L/s is significantly higher than the maximum rainfall rate, thus preventing trapped water in the duct structure 100 from entering the engine 46 even in torrential downpour conditions.

In case of a condition where one or both of the inlets 58 and one or both of the drainage holes 62 is plugged or otherwise obstructed by debris, dashed line 136 is provided to represent the maximum trap capacity, or the level at which water would spill over into the engine compartment when the outboard motor 10 is in the maximum engine tilt condition. Dashed line 138 is provided to illustrate the maximum trap capacity due to drainage that will occur through port and starboard inlets 58 in the maximum engine tilt condition. In an exemplary implementation, the volume of water that may be trapped in the region below the dashed line 138 is approximately 2.1 L for each of the port and starboard duct structures 100. As such, the design of the duct structures 100 ensures that the risk of a significant amount of water reaching the internal combustion engine 46 is low, in both a variety of motor positions, and a variety of adverse water ingress conditions.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A cowling for an outboard motor, the cowling extending from port side to starboard side in a lateral direction, the cowling comprising:

port and starboard inlets that direct flow of intake air into the cowling, the port and starboard inlets facing outwardly in the lateral direction; and port and starboard duct systems located in the cowling, each duct system being configured to receive and convey intake air from one of the port and starboard intake ports to an intake conduit for the outboard motor;

wherein each duct system defines a first separation region configured to receive and convey the intake air from one of the port and starboard intake ports laterally outward to separate a first portion of water from the intake air; and wherein each duct system further defines a second separation region configured to receive and convey the intake air from the first separation region laterally inward to separate a second portion of water from the intake air.

2. The cowling of claim 1, further comprising port and starboard drainage holes that drain the first portion of water and the second portion of water from each duct system.

3. The cowling of claim 2, wherein each duct system extends from a laterally inner lip to a laterally outer lip, and wherein each of the laterally inner and outer lips is secured to an interior surface of the cowling.

4. The cowling of claim 3, wherein each duct system further comprises a plurality of lateral ribs extending between the laterally inner lip and a drainage valley located proximate the laterally outer lip, wherein the drainage valley terminates proximate one of the port and starboard drainage holes.

5. The cowling of claim 4, wherein the plurality of lateral ribs convey the first portion of water to the drainage valley.

6. The cowling of claim 1, wherein the first portion of water is greater than the second portion of water.

7. The cowling of claim 1, wherein the duct system conveys the intake air in a U-shaped path from the port and starboard inlets through the first separation region.

8. The cowling of claim 1, wherein the duct system comprises a curved divider surface positioned between the first separation region and the second separation region.

9. The cowling of claim 1, wherein the duct system conveys the intake air in a U-shaped path from the first separation region through the second separation region.

10. A cowling for an outboard motor, the cowling extending from top to bottom in a vertical direction, from port side to starboard side in a lateral direction that is perpendicular to the vertical direction, and from forward side to aftward side in an axial direction that is perpendicular to the vertical direction and perpendicular to the lateral direction, the cowling comprising:

port and starboard inlets that direct flow of intake air into the cowling, the port and starboard inlets extending downwardly along the aftward side of the cowling and facing outwardly in the lateral direction;

port and starboard duct systems located in the cowling, each duct system being configured to receive and convey intake air from one of the port and starboard intake ports to an intake conduit for the outboard motor;

wherein each duct system defines a first separation region configured to separate a first portion of water from the intake air, the first separation region comprising a first plurality of ribs extending in the lateral direction; and wherein each duct system further defines a second separation region configured to separate a second portion of water from the intake air, the second separation region comprising a second plurality of ribs extending in the vertical direction.

11. The cowling of claim 10, further comprising port and starboard drainage holes that drain the first portion of water and the second portion of water from each duct system.

12. The cowling of claim 11, wherein the first separation region further comprises a drainage valley positioned laterally outward of the first plurality of ribs.

13. The cowling of claim 12, wherein the drainage valley conveys the first portion of water vertically downward and out of the cowling through one of the port and starboard drainage holes.

14. The cowling of claim 11, wherein the second separation region further comprises a drainage floor positioned vertically below the second plurality of ribs.

15. The cowling of claim 14, wherein the drainage floor conveys the second portion of water laterally outward and out of the cowling through one of the port and starboard drainage holes.

16. The cowling of claim 14, wherein the drainage floor comprises a plurality of stepped surfaces that impedes the second portion of water from flowing toward the intake conduit for the outboard motor.

17. The cowling of 10, wherein the first portion of water is greater than the second portion of water.

18. A cowling for an outboard motor, the cowling extending from port side to starboard side in a lateral direction, the cowling comprising:

port and starboard inlets that direct flow of intake air into the cowling, the port and starboard inlets facing outwardly in the lateral direction; and port and starboard duct systems located in the cowling, each duct system being configured to receive and convey intake air from one of the port and starboard intake ports to an intake conduit for the outboard motor;

wherein each duct system defines a first separation region configured to receive and convey the intake air from one of the port and starboard intake ports along a first U-shaped path to separate a first portion of water from the intake air; and wherein each duct system further defines a second separation region configured to receive and convey the intake air from the first separation region along a second U-shaped path to separate a second portion of water from the intake air.

19. The cowling of claim 18, further comprising port and starboard drainage holes that drain the first portion of water and the second portion of water from each duct system.

20. The cowling of claim 18, wherein a pressure drop through one of the port and starboard inlets and one of the port and starboard duct systems is less than 3.5 inches of water gauge.

* * * * *